(12) United States Patent
Zhang et al.

(10) Patent No.: US 10,454,633 B2
(45) Date of Patent: Oct. 22, 2019

(54) METHOD AND APPARATUS FOR DETERMINING SUBFRAME CONFIGURATION OF CELL CLUSTER

(71) Applicant: HUAWEI TECHNOLOGIES CO., LTD., Shenzhen, Guangdong (CN)

(72) Inventors: Jietao Zhang, Shenzhen (CN); Kewen Yang, Shenzhen (CN); Hongcheng Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 15/892,944

(22) Filed: Feb. 9, 2018

(65) Prior Publication Data
US 2018/0167180 A1    Jun. 14, 2018

Related U.S. Application Data

(63) Continuation of application No. PCT/CN2015/086808, filed on Aug. 12, 2015.

(51) Int. Cl.
*H04L 5/00* (2006.01)
*H04L 5/14* (2006.01)
*H04W 72/04* (2009.01)

(52) U.S. Cl.
CPC .......... *H04L 5/0032* (2013.01); *H04L 5/0094* (2013.01); *H04L 5/14* (2013.01);
(Continued)

(58) Field of Classification Search
CPC ....... H04L 5/0032; H04L 5/0094; H04L 5/14; H04L 5/1469; H04W 72/0446; H04W 72/048
(Continued)

(56) References Cited

U.S. PATENT DOCUMENTS

2014/0023004 A1* 1/2014 Kumar ............... H04W 72/082
370/329
2014/0301255 A1 10/2014 Yin et al.
(Continued)

FOREIGN PATENT DOCUMENTS

CN    103037524 A    4/2013
CN    104038943      9/2014
(Continued)

OTHER PUBLICATIONS

3GPP TSG RAN WG1 Meeting #74 R1-133337,"Discussions on Interference Mitigation Schemes for LTE TDD eIMTA",NEC Group,Aug. 19-23, 2013,total 4 pages.
(Continued)

*Primary Examiner* — Robert J Lopata
(74) *Attorney, Agent, or Firm* — Fish & Richardson P.C.

(57) ABSTRACT

Solutions for determining subframe configuration of a cell cluster are provided. In one example method, is obtained by a central control node, the radio resource information required by enhanced interference management and traffic adaptation eIMTA terminals and radio resource information required by conventional terminals in the cell cluster, where the cell cluster includes multiple cells. A TDD subframe configuration of the cell cluster is determined according to the radio resource information required by the eIMTA terminals and the radio resource information required by conventional terminals in the cell cluster. Each cell in the cell cluster is notified of the TDD subframe configuration information of the cell cluster, allowing the implementation of flexible TDD subframe configuration for terminals of different types in the cell cluster.

16 Claims, 3 Drawing Sheets

(52) U.S. Cl.
CPC ......... *H04L 5/1469* (2013.01); *H04W 72/048* (2013.01); *H04W 72/0446* (2013.01)

(58) Field of Classification Search
USPC .......................................................... 370/280
See application file for complete search history.

(56) References Cited

U.S. PATENT DOCUMENTS

| | | | | |
|---|---|---|---|---|
| 2014/0334457 A1* | 11/2014 | Tiirola | ................. | H04L 5/0096 370/336 |
| 2015/0055523 A1* | 2/2015 | Lei | .................... | H04W 72/0446 370/280 |
| 2015/0085721 A1* | 3/2015 | Meng | .................... | H04L 12/189 370/280 |
| 2015/0215078 A1* | 7/2015 | Chen | .................... | H04L 1/1812 370/277 |
| 2015/0289261 A1* | 10/2015 | Oizumi | ................. | H04W 72/02 370/329 |
| 2015/0319636 A1* | 11/2015 | Lee | .................... | H04B 17/345 370/252 |
| 2015/0341927 A1* | 11/2015 | Wei | ................... | H04W 72/0446 370/280 |
| 2016/0192354 A1* | 6/2016 | Wei | ...................... | H04L 1/1812 370/329 |
| 2017/0019218 A1* | 1/2017 | Sadeghi | ................. | H04L 5/001 |
| 2017/0170940 A1* | 6/2017 | Lee | ...................... | H04L 5/0048 |
| 2018/0115430 A1* | 4/2018 | Seo | ...................... | H04W 88/02 |

FOREIGN PATENT DOCUMENTS

| | | |
|---|---|---|
| CN | 104378785 | 2/2015 |
| CN | 104780559 A | 7/2015 |
| WO | 2014043863 A1 | 3/2014 |
| WO | 2015027389 A1 | 3/2015 |
| WO | 2015105378 A1 | 7/2015 |

OTHER PUBLICATIONS

International Search Report issued in International Application No. PCT/CN2015/086808 dated May 11, 2016, 6 pages.
Extended European Search Report issued in European Application No. 15900768.1 dated Jun. 7, 2018, 9 pages.
Office Action issued in Chinese Application No. 201580081469.5 dated Jul. 3, 2019, 7 pages.

* cited by examiner

| CONF #0 | D | S | U | U | U | D | S | U | U | U |
|---------|---|---|---|---|---|---|---|---|---|---|
| CONF #1 | D | S | U | U | D | D | S | U | U | D |
| CONF #2 | D | S | U | D | D | D | S | U | D | D |
| CONF #3 | D | S | U | U | U | D | D | D | D | D |
| CONF #4 | D | S | U | U | D | D | D | D | D | D |
| CONF #5 | D | S | U | D | D | D | D | D | D | D |
| CONF #6 | D | S | U | U | U | D | S | U | U | D |

METHOD AND APPARATUS FOR DETERMINING SUBFRAME CONFIGURATION OF CELL CLUSTER

CROSS-REFERENCE TO RELATED APPLICATIONS

This application is a continuation of International Patent Application No. PCT/CN2015/086808, filed on Aug. 12, 2015, which is hereby incorporated by reference in its entirety.

TECHNICAL FIELD

The present invention relates to the field of wireless communications technologies, and in particular, to a method and an apparatus for determining subframe configuration of a cell cluster.

BACKGROUND

A high rate and diversity are two typical requirements of a personal communications service in the future. Access network densification shortens a wireless communication distance, and basically ensures high-rate connection. A feature of service diversity is that uplink and downlink service requirements of terminals vary according to different applications. A TDD (Time Division Duplex time division duplex) mode is convenient for a service with network service diversity. Therefore, dense deployment of wireless access points in the TDD mode is a trend of a network architecture in the future.

A coverage radius of each cell is greatly reduced because of network densification. In most scenarios, a quantity of terminals served by a cell is far less than that in a macro cell scenario. With diversity of terminal services, a service of each cell will show a relatively high volatility, that is, uplink and downlink services of a cell change relatively rapidly within a short period of time. Therefore, the 3GPP sets up an eIMTA (Enhanced Interference Management and Traffic Adaptation enhanced interference management and traffic adaptation) research project, to research technologies for managing interference in flexible TDD subframe configuration of a cell. In 3GPP R12 specifications, each cell may dynamically select, according to current uplink and downlink service requirements of a cell, TDD subframe configuration that adapts to a service. The greatest challenge brought by dynamic TDD subframe configuration of each cell to network interference management is cross subframe interference between cells; that is, for a same subframe, neighbor cells have different data transmission directions, and consequently, downlink or uplink transmission of a neighbor cell is interfered with by uplink or downlink transmission of a cell. The eIMTA research project is to research how to avoid or eliminate the cross subframe interference between the cells brought by the flexible TDD subframe configuration of the cell.

In the industry, a management thought for the cross subframe interference that may exist in the flexible TDD subframe configuration is: Different cells with a similar feature (for example, a path loss between stations is relatively low, and relatively high interference may be easily generated between the stations) are placed in an interference cell cluster. Each cell in the interference cell cluster uses same TDD subframe configuration, and different interference cell clusters may use different TDD subframe configuration, so as to achieve a compromise between interference management and traffic adaptation. However, currently, there is a singular and an inflexible manner for performing subframe configuration for a cell cluster in the prior art. Further, a factor for determining TDD subframe configuration of a cell cluster is not clear.

SUMMARY

The present invention provides a method and an apparatus for determining subframe configuration of a cell cluster, so as to implement flexible TDD subframe configuration of the cell cluster for terminals of different types.

According to a first aspect, a method for determining subframe configuration of a cell cluster is provided, including:

obtaining, by a central control node, radio resource information required by enhanced interference management and traffic adaptation eIMTA terminals and radio resource information required by conventional terminals in the cell cluster, where the cell cluster includes multiple cells;

determining time division duplex TDD subframe configuration of the cell cluster according to the radio resource information required by the eIMTA terminals and the conventional terminals in the cell cluster; and notifying each cell in the cell cluster of the TDD subframe configuration information of the cell cluster.

With reference to the first aspect, in a specific implementation, the obtaining, by a central control node, radio resource information required by enhanced interference management and traffic adaptation eIMTA terminals and radio resource information required by conventional terminals in the cell cluster includes:

receiving, by the central control node, radio resource information required by the eIMTA terminals and radio resource information required by the conventional terminals, where the radio resource information is sent by each cell in the cell cluster; and collecting statistics about the radio resource information required by all eIMTA terminals and the radio resource information required by all conventional terminals in the cell cluster.

With reference to the foregoing aspect and implementation, the central control node is a base station, a base station controller, or a mobility management entity MME.

With reference to the foregoing aspect and implementations, the determining TDD subframe configuration of the cell cluster according to the radio resource information required by the eIMTA terminals and the conventional terminals in the cell cluster includes:

determining a ratio of uplink resources to downlink resources required by the eIMTA terminals according to the radio resource information required by the eIMTA terminals in the cell cluster, and determining a ratio of uplink resources to downlink resources required by the conventional terminals according to the radio resource information required by the conventional terminals in the cell cluster; and determining TDD uplink-downlink subframe configuration of the cell cluster according to a network policy and the ratio of uplink resources to downlink resources required by the eIMTA terminals and the conventional terminals.

With reference to the foregoing aspect and implementations, the network policy includes a priority weight of the eIMTA terminals and a priority weight of the conventional terminals.

With reference to the foregoing aspect and implementations, the radio resource information required by the eIMTA terminals and the conventional terminals is a quantity of uplink and downlink time-frequency resource blocks, a quantity of uplink and downlink subframes, an uplink and downlink data buffer size, or uplink and downlink service load that is required by the eIMTA terminals and the conventional terminals.

According to a second aspect, a method for determining subframe configuration of a cell is provided, including:

obtaining, by a cell in the cell cluster, radio resource information required by enhanced interference management and traffic adaptation eIMTA terminals and radio resource information required by conventional terminals in the cell cluster; and determining time division duplex TDD subframe configuration of the cell according to the radio resource information required by the eIMTA terminals and the conventional terminals in the cell cluster.

With reference to the second aspect, in a specific implementation, the obtaining, by a cell in the cell cluster, radio resource information required by eIMTA terminals and conventional terminals in the cell cluster includes:

obtaining, by the cell, radio resource information required by eIMTA terminals and conventional terminals of the cell, obtaining radio resource information required by eIMTA terminals and radio resource information required by conventional terminals of another cell in the cell cluster, and collecting statistics about the radio resource information required by all eIMTA terminals and the radio resource information required by all conventional terminals in the cell cluster.

With reference to the foregoing aspect and implementation, the determining TDD subframe configuration of the cell according to the radio resource information required by the eIMTA terminals and the conventional terminals in the cell cluster includes:

determining a ratio of uplink resources to downlink resources required by the eIMTA terminals according to the radio resource information required by the eIMTA terminals in the cell cluster, and determining a ratio of uplink resources to downlink resources required by the conventional terminals according to the radio resource information required by the conventional terminals in the cell cluster; and determining TDD subframe configuration of the cell according to a network policy and the ratio of uplink resources to downlink resources required by the eIMTA terminals and the conventional terminals in the cell cluster.

With reference to the foregoing aspect and implementations, the network policy includes a priority weight of the eIMTA terminals and a priority weight of the conventional terminals.

With reference to the foregoing aspect and implementations, the radio resource information required by the eIMTA terminals and the conventional terminals is a quantity of uplink and downlink time-frequency resource blocks, a quantity of uplink and downlink subframes, an uplink and downlink data buffer size, or uplink and downlink service load that is required by the eIMTA terminals and the conventional terminals.

According to a third aspect, an apparatus for determining subframe configuration of a cell cluster is provided, including:

an obtaining module, configured to obtain radio resource information required by enhanced interference management and traffic adaptation eIMTA terminals and radio resource information required by conventional terminals in the cell cluster, where the cell cluster includes multiple cells;

a configuration module, configured to determine TDD subframe configuration of the cell cluster according to the radio resource information required by the eIMTA terminals and the conventional terminals in the cell cluster; and a notification module, configured to notify each cell in the cell cluster of time division duplex TDD subframe configuration information of the cell cluster.

With reference to the third aspect, in a specific implementation, the obtaining module is specifically configured to:

receive, radio resource information required by the eIMTA terminals and radio resource information required by the conventional terminals, where the radio resource information is sent by each cell in the cell cluster; and collect statistics about the radio resource information required by all eIMTA terminals and the radio resource information required by all conventional terminals in the cell cluster.

With reference to the foregoing aspect and implementation, the apparatus is a base station, a base station controller, or a mobility management entity MME.

With reference to the foregoing aspect and implementations, the configuration module is specifically configured to:

determine a ratio of uplink resources to downlink resources required by the eIMTA terminals according to the radio resource information required by the eIMTA terminals in the cell cluster, and determine a ratio of uplink resources to downlink resources required by the conventional terminals according to the radio resource information required by the conventional terminals in the cell cluster; and determine TDD uplink-downlink subframe configuration of the cell cluster according to a network policy and the ratio of uplink resources to downlink resources required by the eIMTA terminals and the conventional terminals.

With reference to the foregoing aspect and implementations, the network policy includes a priority weight of the eIMTA terminals and a priority weight of the conventional terminals.

With reference to the foregoing aspect and implementations, the radio resource information required by the eIMTA terminals and the conventional terminals is a quantity of uplink and downlink time-frequency resource blocks, a quantity of uplink and downlink subframes, an uplink and downlink data buffer size, or uplink and downlink service load that is required by the eIMTA terminals and the conventional terminals.

According to a fourth aspect, an apparatus for determining subframe configuration of a cell is provided, including:

an obtaining module, configured to obtain radio resource information required by enhanced interference management and traffic adaptation eIMTA terminals and radio resource information required by conventional terminals in the cell cluster; and a configuration module, configured to determine time division duplex TDD subframe configuration of the cell according to the radio resource information required by the eIMTA terminals and the conventional terminals in the cell cluster.

With reference to the fourth aspect, in a specific implementation, the obtaining module is specifically configured to:

obtain radio resource information required by eIMTA terminals and conventional terminals of the cell, obtain radio resource information required by eIMTA terminals and radio resource information required by conventional terminals of another cell in the cell cluster, and collect statistics about the radio resource information required by all eIMTA terminals and the radio resource information required by all conventional terminals in the cell cluster.

With reference to the foregoing aspect and implementation, the configuration module is specifically configured to:

determine a ratio of uplink resources to downlink resources required by the eIMTA terminals according to the radio resource information required by the eIMTA terminals in the cell cluster, and determine a ratio of uplink resources to downlink resources required by the conventional terminals according to the radio resource information required by the conventional terminals in the cell cluster; and determine TDD subframe configuration of the cell according to a network policy and the ratio of uplink resources to downlink resources required by the eIMTA terminals and the conventional terminals in the cell cluster.

With reference to the foregoing aspect and implementations, the network policy includes a priority weight of the eIMTA terminals and a priority weight of the conventional terminals.

With reference to the foregoing aspect and implementations, the apparatus may be a wireless access point corresponding to a cell in the cell cluster, for example, a base station.

According to the method and the apparatus for determining subframe configuration of a cell cluster that are provided in the foregoing embodiment, radio resource information required by terminals of two types in the cell cluster is collected, and subframe configuration of the cell cluster is performed, so as to implement flexible TDD subframe configuration for terminals of different types.

DESCRIPTION OF EMBODIMENTS

In a wireless network, a conventional terminal and a terminal that has an eIMTA function generally co-exist. The conventional terminal does not have an eIMTA function, and the conventional terminal and the terminal that has an eIMTA function use different TDD subframe configuration. In the prior art, during subframe configuration, capabilities and requirements are not distinguished between the terminal that has an eIMTA function and the conventional terminal, and same subframe configuration is used for an entire cell cluster. When a network resource is limited, for example, when a network has heavy load, the network cannot provide differentiated services for terminals of different types, and cannot perform differentiated subframe configuration according to a terminal type. Based on the prior art, in embodiments of the present invention, different capabilities and requirements of terminals of two types are considered, so as to implement TDD subframe configuration of the cell cluster.

In the embodiments of the present invention, for the terminal that has an eIMTA capability and the conventional terminal that exist in a network, when the network determines the TDD subframe configuration of the cell cluster, radio resource information required by the terminals of two types is separately collected, so as to optimize subframe configuration.

A wireless communications network generally includes a wireless access point, a wireless access point controller, and a user terminal, or includes only a wireless access point and a user terminal. The wireless access point may be a base station, an access point AP (Access Point), a transmission point, or the like. The wireless communications network may be a cellular mobile communications network, for example, WCDMA (Wideband Code Division Multiple Access) or LTE (Long Term Evolution), or may be a wireless local area network WLAN (Wireless Local Area Network), a future network, or the like. The cellular mobile communications network is used as an example in the following embodiment. The wireless access point is a base station, and the wireless access point controller is a base station controller.

There are two manners for implementing technical solutions in the present invention: centralized implementation and distributed implementation.

Figure 1:
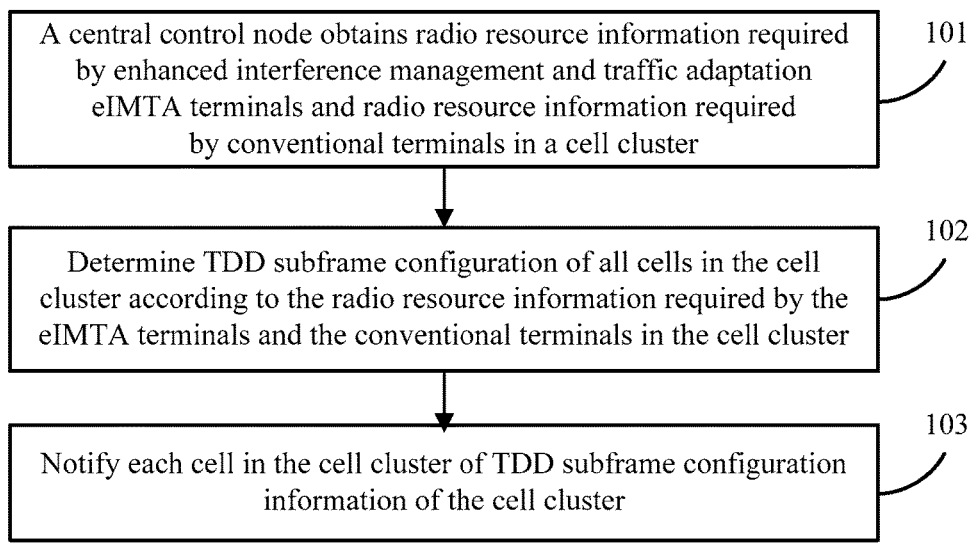
FIG. 1 is a flowchart of a method for determining subframe configuration of a cell cluster according to an embodiment of the present invention.

For the centralized implementation, a central control node in a network collects radio resource information required by terminals of different types in a cell cluster and determines TDD subframe configuration, and delivers a determining result to each cell in the cell cluster. The central control node may be a physical entity such as a base station, a base station controller, or another network device, or may be an independent controller, or may be a functional entity on another network entity on mobility management entity MME (mobility management entity). A function of the central control node is to collect statistics about radio resource information required by terminals of different types in the cell cluster and is responsible for determining TDD subframe configuration used in all cells in the cell cluster. Referring to FIG. 1, main steps of the centralized implementation include the following steps.

101. A central control node obtains radio resource information required by enhanced interference management and traffic adaptation eIMTA terminals and radio resource information required by conventional terminals in a cell cluster, where the cell cluster includes multiple cells.

For example, each cell in the cell cluster sends, to the central control node, radio resource information required by eIMTA terminals and conventional terminals of the cell. Generally, one cell is corresponding to one base station, or multiple cells may be corresponding to one base station. In a specific embodiment, a base station corresponding to each cell in the cell cluster separately sends, to the central control node, radio resource information required by eIMTA terminals and conventional terminals of the cell, for example, wireless uplink and downlink resource information. If the central control node is a base station, radio resource information of a corresponding cell may be transmitted by using an interface between base stations, for example, a load interaction message of an X2 interface. If the central control node is a base station controller, radio resource information corresponding to each cell may be collected by using an interface between the base station controller and a base station.

Certainly, in some cases, a cell in the cell cluster may include only one type of terminal, such as an eIMTA terminal. Therefore, during collection, a quantity of conventional terminals in the cell is 0.

The radio resource information required by the eIMTA terminals and the conventional terminals may be defined as wireless uplink and downlink resource information required when terminals of two types perform corresponding data transmission, such as a quantity of uplink and downlink time-frequency resource blocks, a quantity of uplink and downlink subframes, or an uplink and downlink data buffer size. Alternatively, the radio resource information required by the eIMTA terminals and the conventional terminals may be defined as respective uplink and downlink load information required by the eIMTA terminals and the conventional terminals, and may include any one of the following types: uplink load and downlink load of the eIMTA terminals, uplink load and downlink load of the conventional terminals, overall load and an uplink-downlink service ratio that are of the eIMTA terminals, or overall load and an uplink-downlink service ratio that are of the conventional terminals.

102. Determine TDD subframe configuration of all cells in the cell cluster according to the radio resource information required by the eIMTA terminals and the conventional terminals in the cell cluster.

In this step, the central control node determines, according to radio resource information required by eIMTA terminals and conventional terminals of each cell in the cell cluster, shared TDD subframe configuration used by all cells in the cell cluster. For example, after obtaining radio resource information required by all eIMTA terminals and radio resource information required by all conventional terminals in the entire cell cluster, the central control node may determine an uplink-downlink resource ratio required by all the eIMTA terminals and an uplink-downlink resource ratio required by all the conventional terminals, that is, the uplink-downlink resource ratio required by all the eIMTA terminals and the uplink-downlink resource ratio required by all the conventional terminals in the entire cell cluster. Further, TDD uplink-downlink subframe configuration of the entire cell cluster may be determined according to the ratio.

In another embodiment, in step 101, each cell in the cell cluster may separately report respective uplink resources and respective downlink resources required by the eIMTA terminals and the conventional terminals. After receiving the resource information, the central control node may collect statistics about an uplink-downlink resource ratio required by the eIMTA terminals and an uplink-downlink resource ratio required by the conventional terminals in the cell cluster.

Further, in a specific embodiment, when TDD subframe configuration is determined, a network policy may be further considered in addition to considering radio resource information required by the foregoing terminals of different types in the cell cluster. That is, TDD subframe configuration of all cells in the cell cluster is determined according to the network policy and radio resource information required by the eIMTA terminals and the conventional terminals in the cell cluster. The network policy may be priority weights of terminals of two types.

For example, a carrier's policy is to ensure that a resource is preferentially used by the eIMTA terminals, or when the eIMTA terminals have a higher priority, when determining subframe configuration, the central control node may preferentially allocate more TDD subframe resources to the eIMTA terminals for use. In the prior art, when a network resource is limited, if the eIMTA terminal and the conventional terminal are not distinguished from each other, requests of terminals of two types cannot be met. In the technical solution of this embodiment, because the eIMTA terminal and the conventional terminal are distinguished from each other, when a network resource is limited, it can be ensured that requests of the eIMTA terminals are preferentially met.

For example, when determining subframe configuration of the cell cluster, the central control node may centrally determine subframe configuration of all cells in the cell cluster according to an obtained quantity of subframes required by respective downlink transmission and respective uplink transmission of the eIMTA terminals and the conventional terminals of each cell in the cell cluster. For example, after accumulating obtained corresponding resource requirements of the foregoing terminals of two types of each cell, the central control node obtains, by means of calculation, respective downlink resources and respective uplink resources required by all eIMTA terminals and all conventional terminals of all cells in the cell cluster, that is, a quantity of subframes required by respective downlink transmission and respective uplink transmission required by all eIMTA terminals and all conventional terminals in the cell cluster. Optionally, the central control node then centrally determines subframe configuration of each cell in the cell cluster according to a network policy such as a priority weight. The priority weight is used as a weight factor, and reflects a priority policy used when a network allocates a resource to the eIMTA terminals and the conventional terminals. When the eIMTA terminals have a larger priority weight, it indicates that the network tends to preferentially allocate a resource to the eIMTA terminals for use when the resource is limited. On the contrary, when the conventional terminals have a larger priority weight, it indicates that the network tends to preferentially allocate a resource to the conventional terminals for use when the resource is limited. The central control node performs calculation according to resource requirements of all eIMTA terminals, resource requirements of all conventional terminals in the cell cluster, and priority weights, to obtain resource requirements of all eIMTA terminals and resource requirements of all conventional terminals obtained after a weighted operation. Based on the network resource, the central control node determines corresponding downlink transmission resources and uplink transmission resources of all cells according to a quantity of resource requirements that is obtained after the weighted operation and that is of terminals of two types, that is, TDD subframe configuration of the cell cluster.

103. Notify each cell in the cell cluster of TDD subframe configuration information of the cell cluster.

The central control node may broadcast the TDD subframe configuration information of the cell cluster. After receiving the TDD subframe configuration information, each cell uses new subframe configuration to transmit data for user terminals of two types of the cell. In an embodiment, this step may be completed by a base station corresponding to each cell. One cell may be corresponding to one base station, or multiple cells may be corresponding to one base station.

Figure 2:
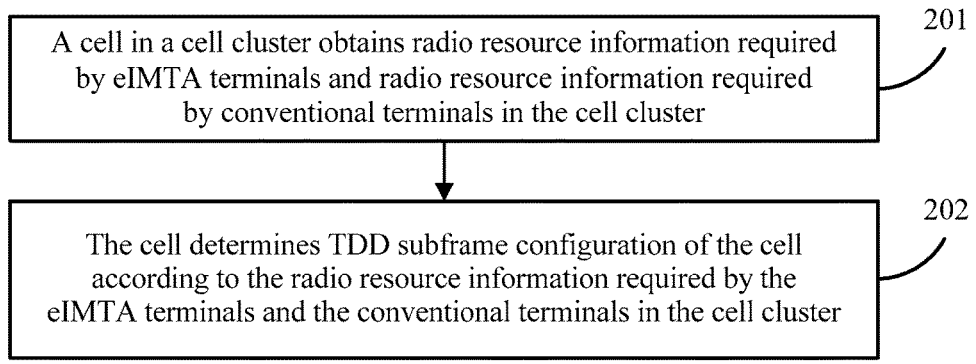
FIG. 2 is a flowchart of a method for determining subframe configuration of a cell according to another embodiment of the present invention.

In the foregoing embodiment, a central control node separately obtains radio resource information required by terminals of different types of each cell in a cell cluster, and centrally determines TDD subframe configuration of the entire cell cluster. In another distributed implementation, each cell in a cell cluster may separately determine TDD subframe configuration of the cell. Different from the foregoing centralized implementation, for the distributed implementation, a cell in the cell cluster obtains radio resource information required by terminals of different types of the cell and another cell in the cell cluster, and determines TDD subframe configuration of the cell according to the obtained radio resource information. Each cell in the cell cluster separately performs a similar operation, that is, separately determines TDD subframe configuration of each cell, so that TDD subframe configuration of the entire cell cluster is determined. Likewise, generally, one cell is corresponding to one base station, or multiple cells may be corresponding to one base station. For one cell, referring to FIG. 2, main steps include the following steps.

201. A cell in a cell cluster obtains radio resource information required by eIMTA terminals and radio resource information required by conventional terminals in the cell cluster, including radio resource information required by eIMTA terminals and conventional terminals of the cell, and radio resource information required by eIMTA terminals and conventional terminals of another cell.

In a specific embodiment, each cell in an interference cell cluster separately exchanges, by using an X2 interface message, radio resource information required by eIMTA terminals and conventional terminals of a respective cell with another cell in the cluster. Therefore, any cell may obtain radio resource information required by eIMTA terminals and conventional terminals of another cell in the cell cluster, and may obtain radio resource information required by eIMTA terminals and conventional terminals of the cell, so that radio resource information required by eIMTA terminals and radio resource information required by conventional terminals in the entire cell cluster are obtained. A type and a definition of the radio resource information are similar to those in the foregoing centralized embodiment, and details are not described again. This step may be completed by a base station corresponding to each cell. One cell may be corresponding to one base station, or multiple cells may be corresponding to one base station.

202. The cell determines TDD subframe configuration of the cell according to the radio resource information required by the eIMTA terminals and the conventional terminals in the cell cluster.

A process of determining subframe configuration is similar to that in the foregoing centralized embodiment, and details are not described again. A difference is: In the foregoing embodiment, a central control node centrally determines TDD subframe configuration of the entire cell cluster, but in this embodiment, a cell determines TDD subframe configuration of the cell, and after determining the TDD subframe configuration of the cell, the cell uses new subframe configuration to transmit data for the eIMTA terminals and the conventional terminals of the cell. After each cell in the cell cluster separately performs the foregoing step, TDD subframe configuration of each cell is determined, and subframe configuration of the entire cell cluster is centrally completed. In an embodiment, this step may be completed by a base station corresponding to each cell. One cell may be corresponding to one base station, or multiple cells may be corresponding to one base station.

Further, the cell uses the TDD subframe configuration to transmit data for user terminals of the cell. After TDD subframe configuration of each cell is determined, each cell separately uses the subframe configuration to transmit data for user terminals of two types of each cell.

Further, similar to the foregoing centralized embodiment, when TDD subframe configuration is determined, a network policy may be further considered in addition to considering radio resource information required by the foregoing terminals of different types in the cell cluster. That is, TDD subframe configuration of the cell is determined according to a network policy and radio resource information required by the eIMTA terminals and the conventional terminals in the cell cluster. The network policy may be priority weights of terminals of two types. In a specific embodiment, a TDD subframe configuration manner in the cell cluster may be performing weighted processing on a resource required by eIMTA terminals and a resource required by conventional terminals. When the eIMTA terminals have a higher priority, the network tends to preferentially allocate a resource to the eIMTA terminals for use when the resource is limited. On the contrary, when the conventional terminals have a higher priority, the network tends to preferentially allocate a resource to the conventional terminals for use when the resource is limited.

For example, each cell in the cell cluster determines subframe configuration of the cell according to an obtained quantity of subframes required by respective downlink transmission and respective uplink transmission of the eIMTA terminals and the conventional terminals of the other cells and the cell in the cell cluster. Specifically, after accumulating obtained corresponding resource requirements of the terminals of two types of another cell and corresponding resource requirements of the terminals of two types of the cell, each cell obtains, by means of calculation, respective downlink resources and respective uplink resources required by all eIMTA terminals and all conventional terminals of all cells in the cell cluster, that is, a quantity of subframes required by downlink transmission and uplink transmission of all eIMTA terminals and all conventional terminals in the cell cluster. Optionally, each cell then determines TDD subframe configuration of the cell according to a network policy such as a priority weight. The priority weight is used as a weight factor, and reflects a priority policy used when a network allocates a resource to the eIMTA terminals and the conventional terminals. When the eIMTA terminals have a larger priority weight, it indicates that the network tends to preferentially allocate a resource to the eIMTA terminals for use when the resource is limited. On the contrary, when the conventional terminals have a larger priority weight, it indicates that the network tends to preferentially allocate a resource to the conventional terminals for use when the resource is limited. Each cell performs calculation according to requirements of all eIMTA terminals and requirements of all conventional terminals of all cells in the cell cluster, and priority weights, to obtain resource requirements of the eIMTA terminals and resource requirements of the conventional terminals obtained after a weighted operation. Based on the network resource, each cell determines corresponding downlink transmission resources and uplink transmission resources of the cell according to a quantity of resource requirements obtained after the weighted operation, that is, TDD subframe configuration. Each cell completes TDD subframe configuration of the cell, so that TDD subframe configuration of the cell cluster is completed.

Compared with the foregoing centralized manner, each cell separately obtains radio resource information required by terminals of different types in a cell cluster, and determines TDD subframe configuration of the cell; and each cell independently performs subframe configuration and uses the subframe configuration. Compared with the foregoing embodiment, subframe configuration information does not need to be delivered to each cell, thereby reducing a signaling procedure and saving a system resource.

In this solution of the present invention, a method for determining subframe configuration of a cell cluster is provided. The method has the following beneficial effects: When TDD subframe configuration of the cell cluster is determined, radio resource information required by eIMTA terminals and conventional terminals of each cell is obtained, and the TDD subframe configuration of the cell cluster is implemented according to the obtained radio resource information of terminals of two types, thereby optimizing TDD resource allocation and ensuring service requirements of terminals of different types. Further, TDD subframe configuration may be further flexibly optimized according to a network policy. For example, when service load is relatively high, the network may further optimize resource allocation according to priorities of terminals of different types.

A TDD-LTE system is used as an example in the following to describe processes of determining TDD subframe configuration in the foregoing embodiments, that is, to further describe specific TDD subframe configuration processes in steps 102 and 202. In the following embodiments, radio resource information required by eIMTA terminals and conventional terminals in a cell cluster is a ratio of a quantity of downlink subframes to a quantity of uplink subframes of terminals of two types; that is, in step 101, a central control node obtains a ratio of a quantity of downlink subframes to a quantity of uplink subframes of eIMTA terminals and conventional terminals of each cell in the cell cluster, and collects statistics about a ratio of a quantity of downlink subframes to a quantity of uplink subframes of all eIMTA terminals and all conventional terminals in the cell cluster. Alternatively, in step 201, a cell obtains a ratio of a quantity of downlink subframes to a quantity of uplink subframes of eIMTA terminals and conventional terminals of each cell in the cell cluster, and collects statistics about the ratio of a quantity of downlink subframes to a quantity of uplink subframes of the eIMTA terminals and the conventional terminals in the entire cell cluster, including the cell and another cell.

Figures 3, 4:
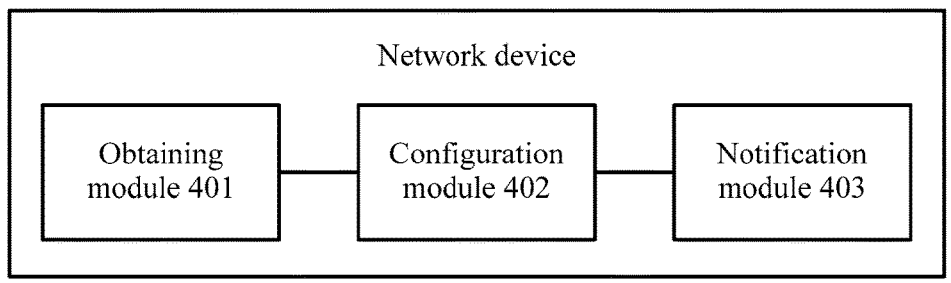
FIG. 3 is a schematic diagram of subframe configuration in a TDD-LTE system.
FIG. 4 is a schematic structural diagram of an apparatus for determining subframe configuration of a cell cluster according to an embodiment of the present invention.

In the TDD-LTE system, specifically, as shown in FIG. 3, seven types of TDD subframe configuration are stipulated in the standard. A frame of a TDD system is divided into ten subframes. D represents a downlink transmission subframe; S represents a special subframe, and may be usually used for downlink transmission, but cannot be used for uplink transmission; and U represents an uplink transmission subframe.

As stipulated in an LTE standard, in configuration 0 to configuration 6, corresponding subframe quantity ratios that may be used for downlink and uplink transmission are respectively 4:6, 6:4, 8:2, 7:3, 8:2, 9:1, and 5:5. The subframe quantity ratio is a ratio of a quantity of subframes configured for downlink transmission to a quantity of subframes configured for uplink transmission in cell configuration. The radio resource information required by the eIMTA terminals and the conventional terminals in the cell cluster is the ratio of a quantity of downlink subframes to a quantity of uplink subframes of terminals of two types. It is assumed that a downlink-uplink subframe quantity ratio that needs to be used by all eIMTA terminals of all cells in the cell cluster is 7:2, and a downlink-uplink subframe quantity ratio that needs to be used by all conventional terminals of all cells in the cell cluster is 2:7. That is, if service requirements of all terminals need to be met, a downlink-uplink subframe quantity ratio required by a system is 9:9, that is, 18 subframes are required. The resource requirement exceeds a total resource (10 subframes) of the system. In this case, in the prior art, because the eIMTA terminal and the conventional terminal cannot be distinguished from each other, during resource allocation, an allocated downlink-uplink subframe quantity ratio is 5:5, that is, to maintain a relative ratio between a downlink requirement and an uplink requirement. Therefore, it can be learned that service requirements of the eIMTA terminals and the conventional terminals cannot be met. In the technical solution of the present invention, the network may distinguish between the eIMTA terminals and the conventional terminals, and may further perform TDD subframe configuration according to different network policies. For example, an allocation ratio of uplink subframes to downlink subframes in the TDD subframe may be adjusted, to some extent, according to resources that need to be used for uplink and downlink data transmission and with reference to network policies for terminals of different types.

Three examples are used for description in the following.

In a first implementation, during resource allocation, a network gives a higher priority to the eIMTA terminals, so that a resource is preferentially allocated to the eIMTA terminals. In this case, a network policy includes a priority weight.

For example, during TDD resource allocation, a weight value given to the eIMTA terminals is a (a<=1), and a weight value given to the conventional terminals is (1−a), so that differentiated resource allocation for terminals of two types can be implemented by setting different values during resource allocation. If the terminals of two types have a same weight value, it indicates that the terminals of two types have a same priority. A larger weight value of a type of terminal indicates that the terminal of the type has a higher priority.

It is assumed that it is learned, according to the radio resource information required by the eIMTA terminals and the conventional terminals in the cell cluster, that a downlink-uplink subframe quantity ratio that needs to be used by all eIMTA terminals of all cells in the cell cluster is 7:2, and a downlink-uplink subframe quantity ratio that needs to be used by all conventional terminals of all cells in the cell cluster is 2:7. It is assumed that, in the network policy, a priority weight value of the eIMTA terminals is set to a=0.7, and a priority weight value of the conventional terminals is set to 1−0.7=0.3. After normalization, a downlink-uplink subframe requirement ratio of the eIMTA terminals is m*a*7:m*a*2, and m is a set normalization factor; and a downlink-uplink subframe requirement ratio of the conventional terminals is m*(1−a)*2:m*(1−a)*7. A total resource is 10 subframes. Therefore, m=10/9 is obtained by calculating m*0.7*7+m*0.7*2+m*0.3*2+m*0.3*7=10, that is, theoretically, a downlink-uplink subframe quantity ratio allocated to the eIMTA terminals by means of calculation according to m*0.7*7:m*0.7*2 is 5.44:1.56, and a downlink-uplink subframe quantity ratio allocated to the conventional terminals by means of calculation according to m*0.3*2+m*0.3*7 is 0.67:2.33. Therefore, theoretically, a downlink-uplink subframe quantity ratio of a cell or a cell cluster is (5.44+0.67):(1.56+2.33)=6.11:3.89, and corresponding closest subframe configuration is Configuration 1 in FIG. 3. In this case, Configuration 1 is selected as TDD subframe configuration of the conventional terminals and the eIMTA terminals, that is, TDD subframe configuration of the entire cell cluster or a cell.

In a second implementation, it is assumed that a downlink-uplink subframe quantity ratio that needs to be used by all eIMTA terminals of all cells in the cell cluster is 7:2, and a downlink-uplink subframe quantity ratio that needs to be used by all conventional terminals of all cells in the cell cluster is 2:7. The network policy needs to ensure that service requirements of the eIMTA terminals are preferentially met, that is, a weight value of the foregoing eIMTA terminals may be set to a=1, and a weight value of the conventional terminals is set to 0. In this case, to preferentially meet requirements of the eIMTA terminals, the subframe configuration that is closest to the requirements of the eIMTA terminals is selected. For example, a subframe of each cell in the cell cluster can be set to Configuration 3 (7:3) or Configuration 4 (8:2), so that uplink and downlink service requirements of the eIMTA terminals can be met, and the remaining subframe resource is allocated to the conventional terminals for use. For example, subframe configuration of each cell in the cell cluster is set to Configuration 3, that is, a downlink-uplink subframe quantity ratio is 7:3. In this case, because a downlink-uplink subframe quantity ratio of the requirements of the eIMTA terminals is 7:2, a cell can allocate all downlink subframes to the eIMTA terminals for downlink transmission, and allocate two subframes of the three uplink subframes to the eIMTA terminals for uplink transmission, thereby ensuring uplink and downlink transmission requirements of the eIMTA terminals. The cell allocates one remaining uplink subframe to the conventional terminals, and service requirements of only some conventional terminals can be met. On the contrary, it can be ensured that service requirements of the conventional terminals are preferentially met, a weight value of the conventional terminals is set to 1, and a weight value of the eIMTA terminals is set to 0. In this case, requirements of the conventional terminals are preferentially met, and the subframe configuration that is closest to the requirements of the conventional terminals is selected.

If requirements of terminals of only one type in the cell cluster are considered, such as the eIMTA terminals, in step 101 or 201, during resource information collection, only statistics about radio resource information required by the eIMTA terminals in the cell cluster may be collected; or if only requirements of the conventional terminals are considered, only statistics about radio resource information required by the conventional terminals are collected.

In a third implementation, during resource allocation, a network gives a higher priority to the conventional terminals, so that a resource is preferentially allocated to the conventional terminals. For example, during resource allocation, a weight value given to the eIMTA terminals is a=0.3, and a weight value given to the conventional terminals is 0.7. According to a similar calculation manner in the first implementation, an allocated downlink-uplink subframe quantity ratio of a cell is 3.89:6.11, and the selected corresponding closest subframe configuration is Configuration 0 (4:6) in FIG. 3.

Certainly, in the foregoing embodiment, that radio resource information is a quantity of uplink and downlink subframes required by terminals of two types is used as an example for description. In the foregoing implementation, an uplink-downlink resource ratio required by all eIMTA terminals and all conventional terminals in the cell cluster may be obtained in a similar calculation manner, for example, by obtaining a radio resource information that is of any other type and that is of the foregoing two terminals such as a quantity of uplink and downlink time-frequency resource blocks, an uplink and downlink data buffer size, or required uplink and downlink load; and then TDD uplink-downlink subframe configuration of the cell cluster or the cell may be further obtained with reference to the network policy.

It can be learned that when a system resource is limited and it is hardly to meet service requirements of all user terminals, for example, when a system has heavy load, in the technical solution in this embodiment of the present invention, resources may be flexibly allocated to terminals of different types according to the network policy.

Corresponding to the foregoing first method embodiment, the present invention further discloses an apparatus for determining subframe configuration of a cell cluster, configured to perform the method in the foregoing embodiment. Referring to FIG. 4, the apparatus includes:

an obtaining module 401, configured to obtain radio resource information required by enhanced interference management and traffic adaptation eIMTA terminals and radio resource information required by conventional terminals in the cell cluster, where the cell cluster includes multiple cells;

a configuration module 402, configured to determine TDD subframe configuration of the cell cluster according to the radio resource information required by the eIMTA terminals and the conventional terminals in the cell cluster; and a notification module 403, configured to notify each cell in the cell cluster of the TDD subframe configuration information of the cell cluster.

The apparatus is a central control node in the foregoing method embodiment. For example, the apparatus may be a base station, a base station controller, or a mobility management entity MME.

Optionally, the obtaining module is specifically configured to:

receive, radio resource information required by the eIMTA terminals and radio resource information required by the conventional terminals, where the radio resource information is sent by each cell in the cell cluster; and collect statistics about the radio resource information required by all eIMTA terminals and the radio resource information required by all conventional terminals in the cell cluster. Alternatively, the obtaining module includes a receiving module and a statistics collecting module, which separately perform the foregoing two steps.

Optionally, the configuration module is specifically configured to:

determine a ratio of uplink resources to downlink resources required by the eIMTA terminals according to the radio resource information required by the eIMTA terminals in the cell cluster, and determine a ratio of uplink resources to downlink resources required by the conventional terminals according to the radio resource information required by the conventional terminals in the cell cluster; and determine TDD uplink-downlink subframe configuration of the cell cluster according to a network policy and the ratio of uplink resources to downlink resources required by the eIMTA terminals and the conventional terminals.

The network policy includes a priority weight of the eIMTA terminals and a priority weight of the conventional terminals.

The radio resource information required by the eIMTA terminals and the conventional terminals is a quantity of uplink and downlink time-frequency resource blocks, a quantity of uplink and downlink subframes, an uplink and downlink data buffer size, or uplink and downlink service load that is required by the eIMTA terminals and the conventional terminals.

All the modules in the foregoing apparatus embodiment may separately perform corresponding steps in the method embodiment. Some steps are not listed one by one. For details, refer to the method embodiment.

Figure 6:
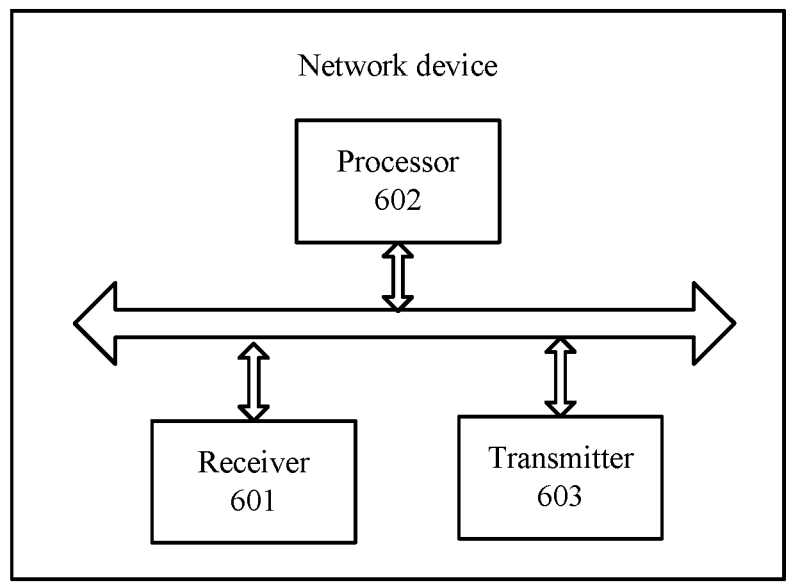
FIG. 6 is a schematic structural diagram of an apparatus for determining subframe configuration of a cell cluster according to still another embodiment of the present invention.

Alternatively, the foregoing apparatus embodiment may be in another form. Referring to FIG. 6, the apparatus includes:

a receiver 601, configured to obtain radio resource information required by enhanced interference management and traffic adaptation eIMTA terminals and radio resource information required by conventional terminals in the cell cluster, where the cell cluster includes multiple cells;

a processor 602, configured to determine TDD subframe configuration of the cell cluster according to the radio resource information required by the eIMTA terminals and the conventional terminals in the cell cluster; and a transmitter 603, configured to notify each cell in the cell cluster of the TDD subframe configuration information of the cell cluster.

The apparatus is similar to that in the foregoing apparatus embodiment. The receiver performs corresponding steps performed by the obtaining module, the processor performs corresponding steps performed by the configuration module, and the transmitter performs corresponding steps performed by the notification module. Other corresponding steps may be performed by the foregoing three units, and are not listed one by one. For details, refer to the foregoing method embodiment and apparatus embodiment. The apparatus is a central control node in the foregoing method embodiment. For example, the apparatus may be a base station, a base station controller, or a mobility management entity MME.

Figure 5:
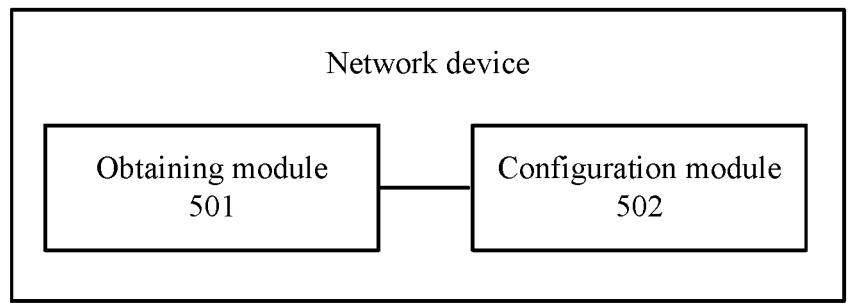
FIG. 5 is a schematic structural diagram of an apparatus for determining subframe configuration of a cell cluster according to another embodiment of the present invention.

Corresponding to the foregoing second method embodiment, the present invention further discloses an apparatus for determining subframe configuration of a cell cluster, configured to perform the method in the foregoing embodiment. The apparatus may be a wireless access point corresponding to a cell in the cell cluster, for example, a base station. Referring to FIG. 5, the apparatus includes:

an obtaining module 501, configured to obtain radio resource information required by enhanced interference management and traffic adaptation eIMTA terminals and radio resource information required by conventional terminals in the cell cluster;

a configuration module 502, configured to determine TDD subframe configuration of the cell according to the radio resource information required by the eIMTA terminals and the conventional terminals in the cell cluster.

Optionally, the obtaining module is specifically configured to:

obtain radio resource information required by eIMTA terminals and conventional terminals of the cell, obtain radio resource information required by eIMTA terminals and radio resource information required by conventional terminals of another cell in the cell cluster, and collect statistics about the radio resource information required by all eIMTA terminals and the radio resource information required by all conventional terminals in the cell cluster. Alternatively, the obtaining module includes a receiving module and a statistics collecting module, which separately perform the foregoing two steps.

Optionally, the configuration module is specifically configured to:

determine a ratio of uplink resources to downlink resources required by the eIMTA terminals according to the radio resource information required by the eIMTA terminals in the cell cluster, and determine a ratio of uplink resources to downlink resources required by the conventional terminals according to the radio resource information required by the conventional terminals in the cell cluster; and determine TDD subframe configuration of the cell according to a network policy and the ratio of uplink resources to downlink resources required by the eIMTA terminals and the conventional terminals in the cell cluster.

The network policy includes a priority weight of the eIMTA terminals and a priority weight of the conventional terminals.

The radio resource information required by the eIMTA terminals and the conventional terminals is a quantity of uplink and downlink time-frequency resource blocks, a quantity of uplink and downlink subframes, an uplink and downlink data buffer size, or uplink and downlink service load that is required by the eIMTA terminals and the conventional terminals.

All the modules in the foregoing apparatus embodiment may separately perform corresponding steps in the method embodiment. Some steps are not listed one by one. For details, refer to the method embodiment.

Alternatively, the foregoing apparatus embodiment may be in another form. Referring to FIG. 6, the apparatus (the transmitter 603 is not included) includes:

a receiver 601, configured to obtain radio resource information required by enhanced interference management and traffic adaptation eIMTA terminals and radio resource information required by conventional terminals in the cell cluster; and a processor 602, configured to determine TDD subframe configuration of the cell according to the radio resource information required by the eIMTA terminals and the conventional terminals in the cell cluster.

The apparatus is similar to that in the foregoing apparatus embodiment. The receiver performs corresponding steps performed by the obtaining module, and the processor performs corresponding steps performed by the configuration module. Other corresponding steps may be performed by the foregoing two units, and are not listed one by one. For details, refer to the foregoing method embodiment and apparatus embodiment. The apparatus may be a wireless access point corresponding to a cell in the cell cluster, for example, a base station.

According to the method and the apparatus for determining subframe configuration of a cell cluster that are provided in the foregoing embodiment, radio resource information required by terminals of two types in the cell cluster is collected, and subframe configuration of the cell cluster is performed, so as to implement flexible TDD subframe configuration for terminals of different types. Further, TDD subframe configuration of the cell cluster may be flexibly adjusted according to network policies for the terminals of different types.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining subframe configuration of a cell cluster, comprising:

obtaining, by a central control node, radio resource information required by enhanced interference management and traffic adaptation (eIMTA) terminals and radio resource information required by conventional terminals in the cell cluster, wherein the cell cluster comprises multiple cells;

determining time division duplex (TDD) subframe configuration of the cell cluster according to the radio resource information required by the eIMTA terminals and the radio resource information required by the conventional terminals in the cell cluster; and notifying each cell in the cell cluster of the TDD subframe configuration information of the cell cluster.

2. The method according to claim 1, wherein the obtaining, by the central control node, radio resource information required by enhanced interference management and traffic adaptation eIMTA terminals and radio resource information required by conventional terminals in the cell cluster comprises:

receiving, by the central control node, radio resource information required by the eIMTA terminals and radio resource information required by the conventional terminals, wherein the radio resource information is sent by each cell in the cell cluster; and collecting statistics about the radio resource information required by all eIMTA terminals and the radio resource information required by all conventional terminals in the cell cluster.

3. The method according to claim 1, wherein the central control node is a base station, a base station controller, or a mobility management entity (MME).

4. The method according to claim 1, wherein the determining TDD subframe configuration of the cell cluster according to the radio resource information required by the eIMTA terminals and the conventional terminals in the cell cluster comprises:

determining a ratio of uplink resources to downlink resources required by the eIMTA terminals according to the radio resource information required by the eIMTA terminals in the cell cluster;

determining a ratio of uplink resources to downlink resources required by the conventional terminals according to the radio resource information required by the conventional terminals in the cell cluster; and determining TDD uplink-downlink subframe configuration of the cell cluster according to a network policy, the determined ratio of uplink resources to downlink resources required by the eIMTA terminals, and the determined ration of uplink resources to downlink resources required by the conventional terminals.

5. The method according to claim 4, wherein the network policy comprises a priority weight of the eIMTA terminals and a priority weight of the conventional terminals.

6. The method according to claim 1, wherein the radio resource information required by the eIMTA terminals and radio resource information required by the conventional terminals is at least one of a quantity of uplink and downlink time-frequency resource blocks, a quantity of uplink and downlink subframes, an uplink and downlink data buffer size, and uplink and downlink service load that is required by the eIMTA terminals and the conventional terminals.

7. A method for determining subframe configuration of a cell, comprising:

obtaining, by a cell in a cell cluster comprising multiple cells, radio resource information required by enhanced interference management and traffic adaptation (eIMTA) terminals and radio resource information required by conventional terminals in the cell cluster; and determining time division duplex (TDD) subframe configuration of the cell according to the radio resource information required by the eIMTA terminals and the radio resource information required by the conventional terminals in the cell cluster.

8. The method according to claim 7, wherein the obtaining, by the cell in the cell cluster, radio resource information required by eIMTA terminals and radio resource information required by the conventional terminals in the cell cluster comprises:

obtaining, by the cell, radio resource information required by eIMTA terminals and radio resource information required by conventional terminals of the cell;

obtaining radio resource information required by eIMTA terminals and radio resource information required by conventional terminals of another cell in the cell cluster; and collecting statistics about the radio resource information required by all eIMTA terminals and the radio resource information required by all conventional terminals in the cell cluster.

9. The method according to claim 7, wherein the determining TDD subframe configuration of the cell according to the radio resource information required by the eIMTA terminals and radio resource information required by the conventional terminals in the cell cluster comprises:

determining a ratio of uplink resources to downlink resources required by the eIMTA terminals according to the radio resource information required by the eIMTA terminals in the cell cluster;

determining a ratio of uplink resources to downlink resources required by the conventional terminals according to the radio resource information required by the conventional terminals in the cell cluster; and determining TDD subframe configuration of the cell according to a network policy and the ratio of uplink resources to downlink resources required by the eIMTA terminals and the ratio of uplink resources to downlink resources required by the conventional terminals in the cell cluster.

10. The method according to claim 7, wherein the network policy comprises a priority weight of the eIMTA terminals and a priority weight of the conventional terminals.

11. An apparatus for determining subframe configuration of a cell cluster, comprising:

a receiver, the receiver configured to obtain radio resource information required by enhanced interference management and traffic adaptation (eIMTA) terminals and radio resource information required by conventional terminals in the cell cluster, wherein the cell cluster comprises multiple cells;

at least one processor, the at least one processor configured to determine time division duplex (TDD) subframe configuration of the cell cluster according to the radio resource information required by the eIMTA terminals and the radio resource information required by the conventional terminals in the cell cluster; and a transmitter, configured to notify each cell in the cell cluster of the TDD subframe configuration information of the cell cluster.

12. The apparatus according to claim 11, wherein the receiver is configured to:
   receive, radio resource information required by the eIMTA terminals and radio resource information required by the conventional terminals, wherein the radio resource information is sent by each cell in the cell cluster; and
   collect statistics about the radio resource information required by all eIMTA terminals and the radio resource information required by all conventional terminals in the cell cluster.

13. The apparatus according to claim 11, wherein the apparatus is a base station, a base station controller, or a mobility management entity MME.

14. The apparatus according to claim 11, wherein the at least one processor is configured to:
   determine a ratio of uplink resources to downlink resources required by the eIMTA terminals according to the radio resource information required by the eIMTA terminals in the cell cluster;
   determine a ratio of uplink resources to downlink resources required by the conventional terminals according to the radio resource information required by the conventional terminals in the cell cluster; and
   determine TDD uplink-downlink subframe configuration of the cell cluster according to a network policy, the ratio of uplink resources to downlink resources required by the eIMTA terminals, and the ratio of uplink resources to downlink resources required by the conventional terminals.

15. The apparatus according to claim 14, wherein the network policy comprises a priority weight of the eIMTA terminals and a priority weight of the conventional terminals.

16. The apparatus according to claim 11, wherein the radio resource information required by the eIMTA terminals and the radio resource information required by the conventional terminals is at least one of a quantity of uplink and downlink time-frequency resource blocks, a quantity of uplink and downlink subframes, an uplink and downlink data buffer size, and an uplink and downlink service load that is required by the eIMTA terminals and the conventional terminals.

* * * * *